(12) United States Patent
Maletzky et al.

(10) Patent No.: US 8,755,256 B2
(45) Date of Patent: Jun. 17, 2014

(54) PLASMON RESONATOR WITH DUAL WAVEGUIDE EXCITATION FOR TAMR

(71) Applicant: Headway Technologies, Inc., Milpitas, CA (US)

(72) Inventors: Tobias Maletzky, San Jose, CA (US); Xuhui Jin, San Jose, CA (US); Yiming Wang, San Jose, CA (US); Dayu Zhou, Fremont, CA (US); Joe Smyth, Aptos, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/676,490

(22) Filed: Nov. 14, 2012

(65) Prior Publication Data

US 2014/0133283 A1 May 15, 2014

(51) Int. Cl.
*G11B 11/00* (2006.01)

(52) U.S. Cl.
USPC .................................. 369/13.33; 369/13.13

(58) Field of Classification Search
USPC ........ 369/13.33, 13.13, 13.32, 13.17, 112.09, 369/112.14, 112.21, 112.27, 300; 360/59; 385/129, 31, 88–94; 29/603.01–603.27; 250/201.3, 201.5
See application file for complete search history.

(56) References Cited

U.S. PATENT DOCUMENTS

| 5,712,840 | A | 1/1998 | Matsumura et al. | |
|---|---|---|---|---|
| 6,954,331 | B2 | 10/2005 | Crawford et al. | |
| 7,272,079 | B2 | 9/2007 | Challener | |
| 8,000,178 | B2 | 8/2011 | Shimazawa et al. | |
| 8,014,101 | B2 | 9/2011 | Shimazawa et al. | |
| 8,023,365 | B2 | 9/2011 | Hongo et al. | |
| 8,036,069 | B1 | 10/2011 | Jin et al. | |
| 8,238,202 | B2 * | 8/2012 | Schreck et al. | 369/13.33 |
| 8,248,898 | B2 * | 8/2012 | Schreck et al. | 369/13.33 |
| 8,289,650 | B2 | 10/2012 | Seigler et al. | |
| 8,335,052 | B2 * | 12/2012 | Takayama et al. | 360/125.31 |
| 8,358,565 | B2 * | 1/2013 | Komura et al. | 369/13.33 |
| 2006/0075417 | A1 * | 4/2006 | Miyanishi et al. | 720/658 |
| 2008/0192376 | A1 | 8/2008 | Tanaka et al. | |
| 2008/0204916 | A1 * | 8/2008 | Matsumoto et al. | 360/59 |
| 2011/0205865 | A1 | 8/2011 | Matsushima et al. | |
| 2011/0292537 | A1 * | 12/2011 | Jin et al. | 360/59 |

* cited by examiner

*Primary Examiner* — Tan X Dinh
(74) *Attorney, Agent, or Firm* — Saile Ackerman LLC; Stephen B. Ackerman

(57) ABSTRACT

A TAMR (Thermal Assisted Magnetic Recording) write head uses the near field energy of optical-laser excited plasmon eigenmodes in a plasmon resonator to locally heat a magnetic recording medium and reduce its coercivity and magnetic anisotropy. The plasmon resonator is formed as a conducting disk-shaped structure with an extending peg that serves to further confine the near fields within a small region of the recording medium. The resonator eigenmodes are excited, through direct or evanescent coupling, by an interference pattern formed by the overlap of optical waves within a dual-channel waveguide, the interference pattern being the result of the waves in one branch being phase-shifted relative to the waves in the other branch.

28 Claims, 7 Drawing Sheets

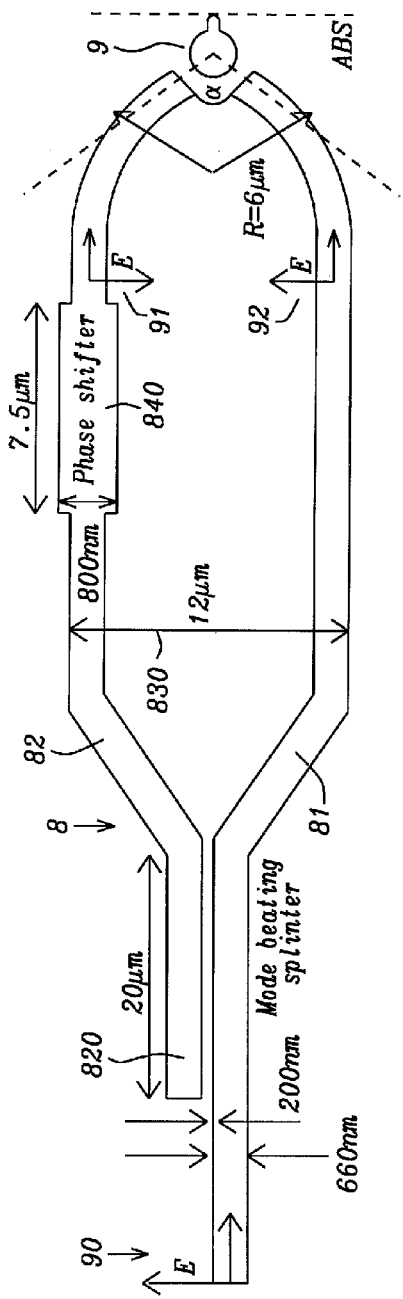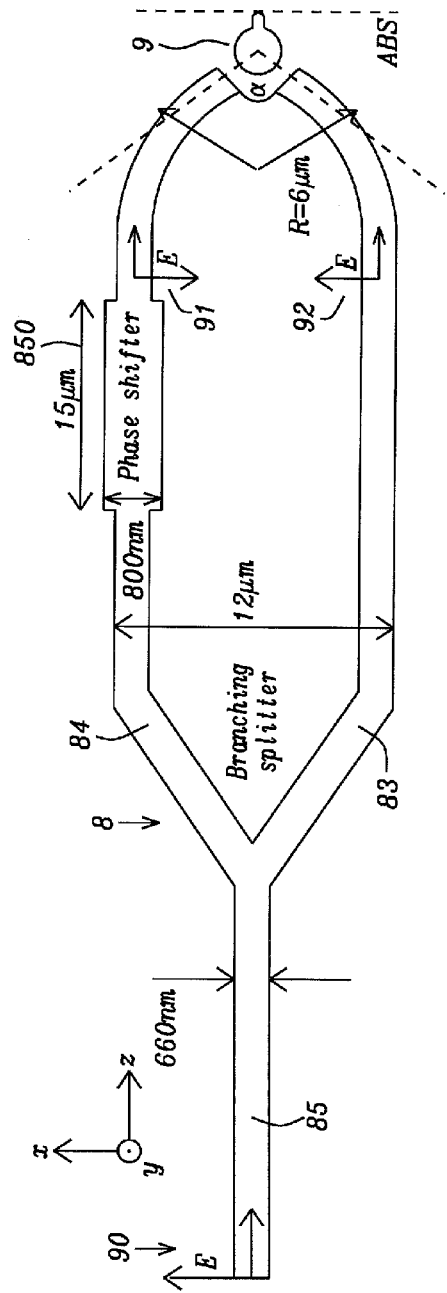
FIG. 2a
FIG. 2b

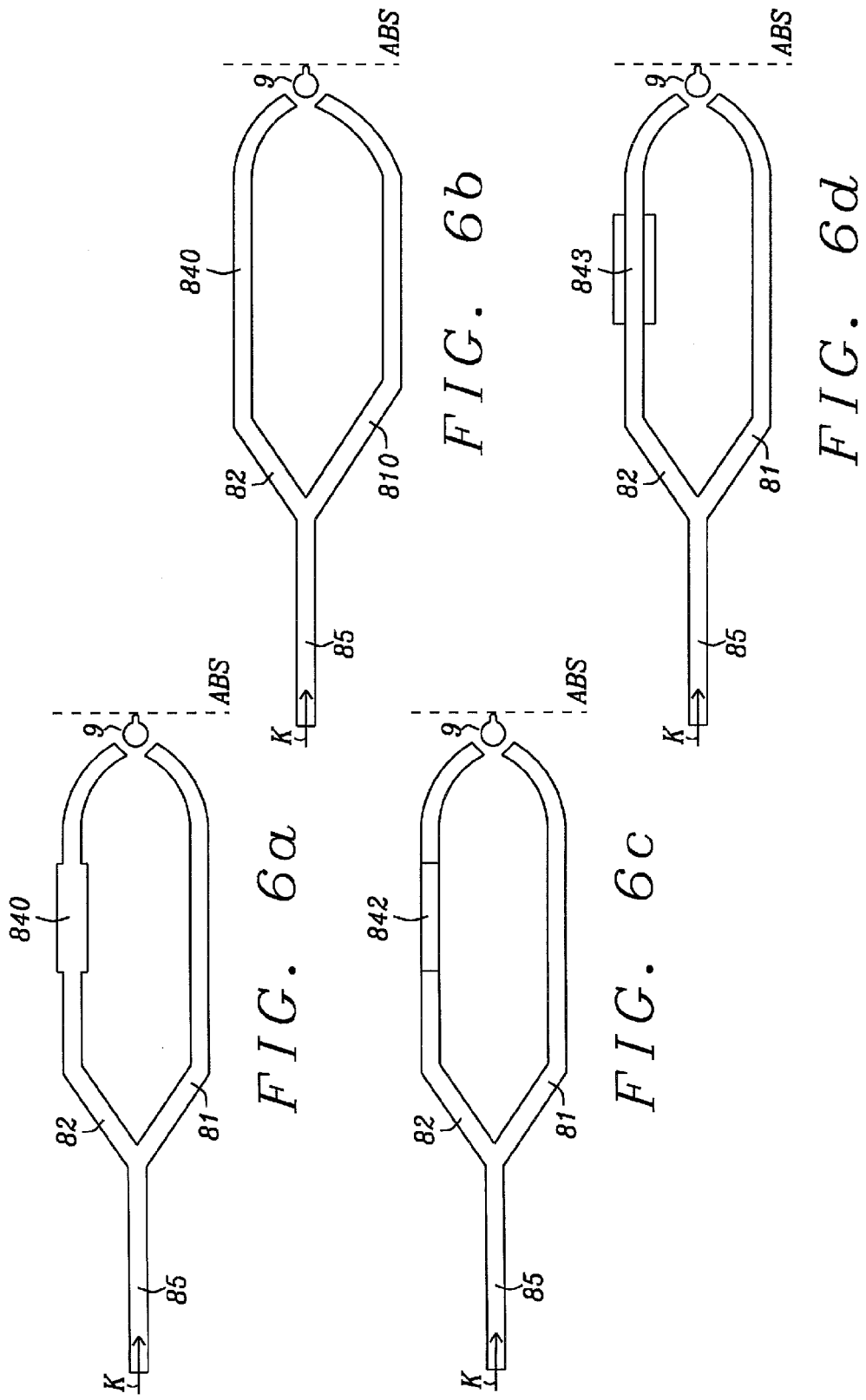

PLASMON RESONATOR WITH DUAL WAVEGUIDE EXCITATION FOR TAMR

BACKGROUND

1. Technical Field

This disclosure relates to the fabrication of magnetic read/write heads that employ TAMR (thermally assisted magnetic recording) to transfer energy from laser radiation to plasmon modes that then enable writing on magnetic media having high coercivity and magnetic anisotropy. More particularly, it relates to the generation of plasmon modes using a plasmon resonator in order to produce field patterns that transfer plasmon energy more effectively.

2. Description

Magnetic recording at area data densities of between 1 and 10 Tera-bits per $in^2$ involves the development of new magnetic recording media, new magnetic recording heads and, most importantly, a new magnetic recording scheme that can delay the onset of the so-called "superparamagnetic" effect. This latter effect is the thermal instability of the extremely small regions of magnetic material on which information must be recorded, in order to achieve the required data densities. A way of circumventing this thermal instability is to use magnetic recording media with high magnetic anisotropy and high coercivity that can still be written upon by the increasingly small write heads required for producing the high data density. This way of addressing the problem produces two conflicting requirements:

1. The need for a stronger writing field that is necessitated by the highly anisotropic and coercive magnetic media.
2. The need for a smaller write head of sufficient definition to produce the high areal write densities, which write heads, disadvantageously, produce a smaller field gradient and broader field profile.

Satisfying these requirements simultaneously could be a potentially limiting factor in the further development of the present magnetic recording scheme used in state of the art hard-disk-drives (HDD). If that were the case, further increases in recording area density might not be achievable within those schemes. One way of addressing these conflicting requirements is by the use of assisted recording methodologies, notably thermally assisted magnetic recording, or TAMR.

If an assisted recording scheme can produce an advantageous medium-property profile to enable low-field writing localized at the write field area, then even a weak write field can produce high data density recording because of the multiplicative effect of the spatial gradients of both the medium property profile and the write field.

The heating effect of TAMR works by raising the temperature of a small region of the magnetic medium to essentially its Curie temperature ($T_C$), at which temperature both its coercivity and anisotropy are temporarily reduced and the magnetic write field required to switch the magnetization of the medium grains is correspondingly reduced as well.

The structure of a TAMR head, in addition to its reading and writing elements, usually includes an optical laser, an optical waveguide (WG) and a plasmon resonator (PR) or plasmon generator (PG). The WG acts as an intermediate path to guide the laser light to the PR or PG, where the optical mode in the WG couples to the local plasmon mode in the PR or the propagating plasmon mode in the PG. After being converted to the plasmon energy either by plasmon excitation in the PR or by plasmon transmission in the PG, the optical energy of the laser is then concentrated at a region of the medium where medium heating and the recording process are to occur. Thus, assuming the heating spot and the magnetic field of the transducer are properly aligned, TAMR recording can be achieved.

Previous methods have utilized an edge plasmon mode to couple to the WG transmitted visible radiation and then concentrated the resulting plasmon energy at the ABS (air bearing surface) of the TAMR head. This approach leads to a smaller thermal gradient than required for certain types of media, particularly in the case of a recording layer with metallic optical properties. Thus, certain types of recording media do not permit the generation of a thermal gradient that will allow the TAMR assist to occur as desired.

Various approaches, such as those taught by:
K. Tanaka et al. (US Publ. Pat. App. 2008/0192376), K. Shimazawa et al. (US Publ. Pat. Appl. 2008/0198496), Shimazawa et al. (U.S. Pat. No. 8,000,178 B2), Jin et al. (U.S. Pat. No. 8,036,069 B1), William Albert Challener (US Publ. Pat. Appl. 2005/0289576 A1), Michael Allen Seigler et al. (US Publ. Pat. Appl. 2009/0073858 A1), Matsumura et al (U.S. Pat. No. 5,712,840), Hongo et al. (U.S. Pat. No. 8,023,365), Matsushima et al. (U.S. Publ. Pat. Appl. 2011/0205865) and Crawford et al. (U.S. Pat. No. 6,954,331) have failed to address the TAMR problem using the method and device to be disclosed below and with the results obtained by that method and device.

SUMMARY

It is an object of this disclosure to produce a plasmon generating structure that creates an improved thermal gradient in a wider range of magnetic media than is currently done.

It is a further object of this disclosure to produce such a plasmon generating structure by utilizing two channel waveguides and making use of a similar coupling between the external laser diode and slider as in the present design.

It is still a further object of this disclosure to produce such a plasmon generating structure by utilizing a phase shifting apparatus that only varies the in-plane geometry of the waveguide, thereby benefitting from a simplicity of design and fabrication.

To achieve the above objects, it is necessary to create a localized heating spot in a recording medium that is smaller than the diffraction limit of the optical spot produced by the optical beam. This reduction of spot size requires the use of a plasmonic device, rather than a purely optical device, which plasmonic device in the present case is a plasmon resonator. The plasmon resonator is a small geometric form, preferably a disc oriented in a plane that is perpendicular to the ABS plane (as will be shown below) and formed of a composite alloy of Ag, Au, Cu and/or Al. The plasmon resonator will heat the magnetic medium using Joule heating produced by the near field of a plasmon eigenmode established within the resonator.

The plasmon resonator has a number of eigenmodes for a given light frequency. To couple the propagating light in the waveguide to the resonator eigenmodes, a field pattern of the propagating light must be created that matches a field pattern of one of the eigenmodes of the resonator. Here, the field pattern is created in the form of an interference pattern at the position of the plasmon resonator by using two waveguides aimed at the plasmon resonator whose optical waves are 180° out of phase with each other and whose transverse electric field component should be in the plane of the disc of the plasmon resonator.

BRIEF DESCRIPTION OF THE DRAWINGS

The objects, features, and advantages of the present invention are understood within the context of the Description of the Preferred Embodiments as set forth below. The Description of the Preferred Embodiments is understood within the context of the accompanying figures, wherein:

FIG. 2 (a) is a schematic overhead illustration of a waveguide structure formed as a mode beating splitter, in which a single wave transmitted by a wave guide creates a coupled wave of identical frequency and 90° phase shift in an adjacent, but physically disjoint channel. The disjoint channel contains a phase shifter that shifts the E-field of its wave by an additional 90° for a total of 180°, so that when the waves are combined, the needed interference pattern occurs.

FIG. 2 (b) is a schematic overhead illustration of a waveguide structure formed as a branching splitter, in which a single waveguide is split into two branches, each of which transmits a portion of the wave. One branch contains a phase shifter that shifts the phase of the E-field of its propagating wave relative to the phase of the wave propagating in the other branch by 180°, so that the recombined waves form the needed interference pattern around the PR position.

FIGS. 6 (a), 6(b), 6(c) and 6 (d) schematically show four implementations of a phase shifting device formed within a branching splitter structure in which the effective mode index in one branch is changed. In (a), the effective mode index is changed by varying the width of part of the waveguide core; in (b) it is changed by increasing the length of one branch; in (c) it is changed by changing the refractive index of the core of one branch; in (d) it is changed by replacing a portion of the cladding material of one branch by a material having a different refractive index.

FIG. 8 (a) looks the same for both cases.

DETAILED DESCRIPTION

Figure 1A:
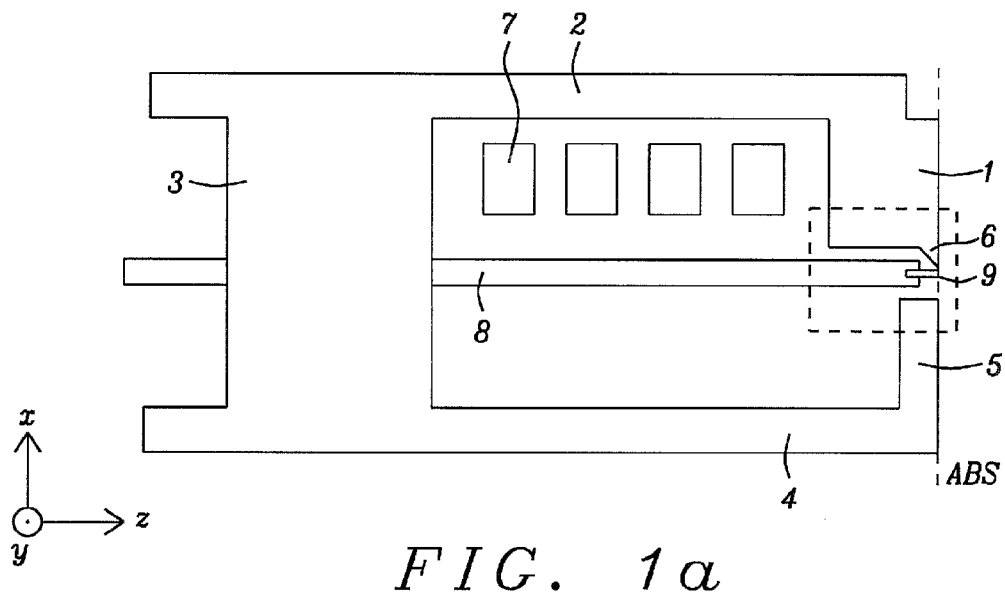
FIGS. 1(a), (b) and (c) are, respectively and schematically:
(a) a vertical cross-section of the TAMR writer of this disclosure;
(b) an enlarged and isolated image of the section that contains the plasmon resonator (PR)
(c) an ABS view of the structure in (b).

Each of the embodiments described in this disclosure is a method and apparatus for efficiently and effectively coupling an electromagnetic wave channeled by an optical waveguide to an eigenmode of a plasmon resonator (PR). The coupling is achieved by matching an interference pattern of the waveguide mode to an eigenmode of the plasmon resonator. The plasmon resonator then creates a near field mode at the region of writing to the recording medium. The near field, in turn, transfers thermal energy to the medium via Joule heating and that Joule heating produces a sufficiently strong thermal gradient that results in a coercivity gradient within the medium which, together with the magnitude and gradient of the magnetic write field, produces effective writing (TAMR) within the magnetic medium.

Efficient coupling of propagating light, as in a WG, to a plasmon mode in a resonator (PR), can be achieved by matching an interference pattern of the propagating light in the WG to an eigenmode of the PR. The interference pattern, in turn, can be formed by essentially aiming two out-of-phase sources of coherent radiation at the plasmon resonator. In the present disclosure, the out of phase sources can be either two waveguide channels formed by splitting a single waveguide channel, or two distinct waveguides that are radiatively coupled.

Referring first to FIG. 1 (a), there is shown a vertical cross-section of the present TAMR writer structure. The ABS plane is shown as a dashed line. For purposes of all following figure descriptions, the direction towards the ABS plane will be denoted the z-direction, the direction perpendicular to plane of the illustration (out of the paper), will be called the y-direction, the vertical direction in the plane of the illustration will be the x-direction.

The magnetic part of the structure includes a main pole (1), a yoke (2), a back gap (3), a return pole (4), a pedestal (5), a sloped stitch pole (6) and the energizing coil cross-sections (7). The optical portion of the structure includes the waveguide structure (8) and the plasmon resonator (9) that is itself formed as a noble metal disk with an attached peg. The diameter of the disc (in the y-z plane) and its height must be adjusted to match the wavelength used in the application and to the indices of refraction of the surrounding materials. For example, if the disk is embedded in $SiO_2$, whose index of refraction, n=1.46, and if the vacuum wavelength of the optical radiation is $\lambda$=808 nm, the appropriate disk diameter is d☐~240 nm and its thickness should be t~30 nm. The resonator may be placed directly between the two ends of the waveguide where it is positioned within the interference field, or it may be separated from the waveguide ends and be coupled evanescently.

FIG. 1 (b) is an enlarged version of the near-ABS portion of FIG. 1(a) which is shown as a boxed-region in 1(a), now showing more clearly the pedestal (5) and the plasmon resonator (9) emerging from the center of the ABS end of the waveguide.

FIG. 1 (c) shows the ABS view of 1 (a) and/or 1 (b) in which the disk-shaped plasmon resonator (9) with an attached peg appears from the front as a rectangular shape. The height of the plasmon resonator (9) is in the vertical direction, the disk diameter is the width in the horizontal direction.

Referring next to FIG. 2(a), there is shown a top view (y-z plane) of the waveguide 2-channel structure (also referred to as a double-branched structure) for a mode-beating splitter formation and the plasmon resonator into which they feed electromagnetic radiation. The structures in the figure are denoted as (8) and (9) in FIG. 1 (a) and are denoted identically here.

Figure 3:
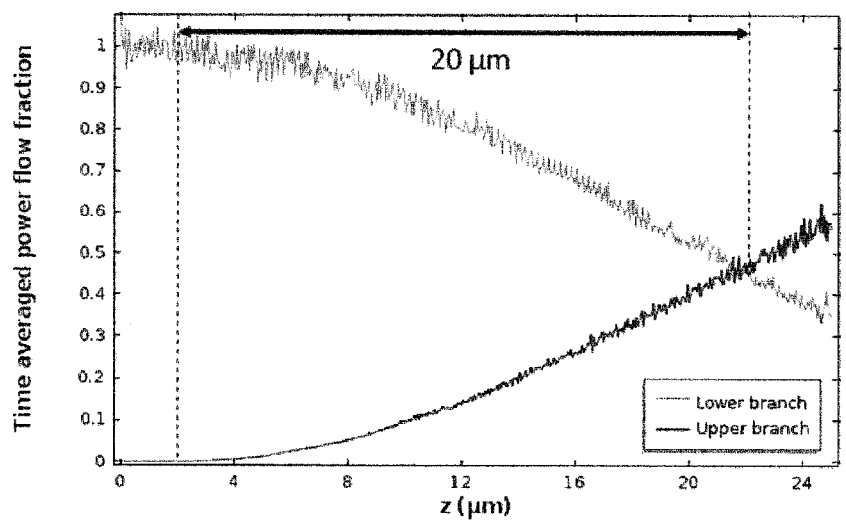
FIG. 3 is a graphical indication of the transfer of energy (the time-averaged power flow fraction) between the two waves in the mode beating splitter of FIG. 2 (a).

An electromagnetic wave (90) is shown entering one branch/channel (81) of the waveguide. The wave enters at a single waveguide portion, because the upper branch is partially offset from the lower branch and does not yet begin at the place of wave entry. The electromagnetic wave has its E-field polarized at its entry in the −y-direction of the y-z plane and its propagation direction, k, is along the z-direction and into the channel towards the ABS plane. The power in this injected mode is ultimately divided, 50/50 between the upper (82) and lower (81) channels by choosing the relative lengths of the overlapping portion (820). Note that the overlap (820) is the region at which both symmetric and antisymmetric modes are excited in the system and that the beating between these modes leads to a transfer of energy between the upper and lower channels. FIG. 3 will show, graphically, how the energy flows between the upper and lower branches.

These two modes (antisymmetric and symmetric) propagate with different speeds, so the total field distribution oscillates between the two branches. This beating mechanism is also responsible for the occurrence of a 90° phase shift between the two branches. The ability to adjust the length of the overlap and, therefore, to alter the length of the coupling region between the modes, offers the option of adjusting the field amplitudes between the two branches.

The branches (81) and (82) have an internal core of Ta oxide (n=2.15) and a cladding of Si oxide (n=1.46). The width of the branches (81), (82) in the y-direction is □600 nm and its height in the x-direction is □400 nm. The plasmon resonator (9) is a disk of diameter □240 nm in the (y-z) plane as shown and its height (or thickness) in the x-direction is □30 nm. The angle, a, between the re-converging ABS ends of the waveguide branches feeding into the resonator, is approximately 100°. The ends of the two channels are bent towards each other in a radius of curvature of R=6 μm (microns) to produce a re-convergence of the two branches at the position of the plasmon resonator.

The upper branch (82) is separated by a distance s from the lower branch (81) by s=200 nm along a linear, overlapping section that is of length d=20 μm in length (820) as shown. The upper channel then diverges from the lower channel to create a maximum separation of approximately 12 μm (830). The separation between the branches (200 nm) at overlap and the length of the linear portion of the upper channel of 20 μm, are important in determining the relative amount of electromagnetic energy in each channel and also create a phase shift of 90° in the upper channel relative to the lower.

The upper branch includes a phase-shifting device (840) that is a 7.5 μm long region of the channel that is 800 nm in thickness as compared to the 600 nm thickness of the remainder of the channel. This phase shifting device, and others that will operate by a different method but achieve the same result, will shift the phase of the exiting wave by 90° relative to a wave in an unaltered channel. The operation of the mode beating splitter itself will have already shifted the phase of the wave in the upper channel (82) by 90° relative to the lower channel (81) before the wave has entered the phase shifter (840). Thus, the wave leaving the phase shifter (91) is now shifted by 180° relative to its counterpart in the lower branch (92).

As the electromagnetic wave exits the phase shifting portion its E-field (91) is shown polarized in the y-direction, while the corresponding E-field in the lower branch (92) is polarized in the −y direction. This illustrates the phase shift by 180° relative to each other. This will remain so until reaching the plasmon resonator (9). These oppositely directed E-fields will then create an interference pattern at the location of the plasmon resonator (9).

Referring next to FIG. 2(b), there is shown a branching splitter, which is an alternative waveguide structure that achieves the same results of coupling a propagating electromagnetic field to an eigenmode of a plasmon in a plasmon resonator. In this waveguide structure, a single linear portion (85) of the waveguide, of width 600 nm, splits (branches) continuously into upper (84) and lower (83) branches that are separated by a maximum distance of 12 μm in the y-z plane. The upper channel includes a phase shifting portion (850) that is a 15 μm long section of waveguide that is 800 nm in thickness. This phase shifter must create a 180° phase shift because the waves in both channels are in phase with each other before the upper channel phase shifter is entered.

When the electromagnetic wave leaves this phase shifting portion, its E-field (91) is directed in the y-direction as compared to the E-field at the corresponding position in the lower (non-phase-shifted portion) which is shown in the −y direction (92). This illustrates the fact that they are out of phase by 180° and will remain so until they reach the plasmon resonator (9) at which position they will create an interference pattern.

The angle, a, between the ABS ends of the waveguide branches feeding into the resonator, is approximately 100°. The ends of the two channels are bent towards each other in a radius of curvature of R=6 μm (microns) to produce a re-convergence of the two branches at the position of the plasmon resonator.

The function of the phase shifter is realized by varying the waveguide width for a certain length in one of the branches. In general, the effective optical path length is given in terms of an effective index of refraction, $n_{eff}$, which is a function of the dimensions of the waveguide and the core and cladding materials.

Figure 8A:
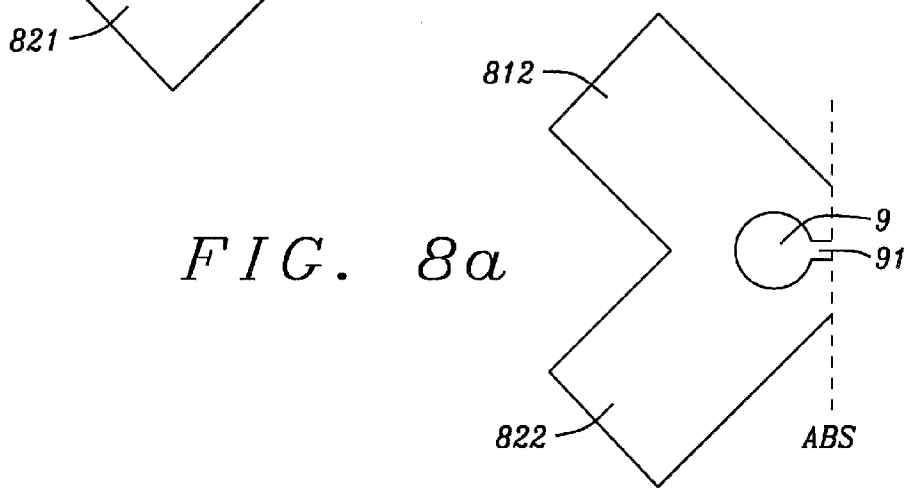
FIGS. 8 (a), 8(b) and 8(c) schematically illustrate a top view (a) and ABS views (b) and (c), for a plasmon resonator formed inside the waveguide core (b) and outside the waveguide core for evanescent radiative coupling (c).

Note in FIGS. 2(a) and 2(b) the ends of the waveguide channels terminate before the ABS and the plasmon resonator with the extending peg is interposed between the waveguide ends and the ABS. It is also possible to extend the waveguide ends to reach the ABS and to incorporate the plasmon resonator within the core material of the ends to create an integrated configuration. This configuration will be shown in FIGS. 8(a), 8(b) and 8(c).

Referring next to FIG. 3, there is shown a graphical representation of the time-averaged power flow fraction in the upper and lower branches of the mode beating splitter of FIG. 2(a). The close coupling (at overlap) of the upper and lower branches allows power to be transferred from the lower branch, into which the electromagnetic wave is initially injected, into the upper branch, which initially has no portion of the injected wave. A symmetric and an antisymmetric mode form between the upper and lower channels, by which the power oscillates between 0 and 100 percent in each of the channels as a function of both the overlap and separation between them. By a proper choice of this overlap length, a 50% condition of power distribution can be obtained. The graph shows that the choice of the branching point, here being approximately 20 μm at a separation of 200 nm between the two branches, enables the power in each channel to be equalized.

Referring now to FIGS. 4 (a) and 4 (b), there is shown a simulation of the E-field amplitude distribution in the single (85) and the upper (84) and lower (83) branches of the branching splitter of FIG. 2(b). As indicated in (a) of the figure, approximately 63% of the energy is distributed between the two branches (arrows), the remainder forming a propagating portion between (and surrounding) the two branches that ultimately does not contribute to the coupling with the plasmon resonator.

Figure 4A:
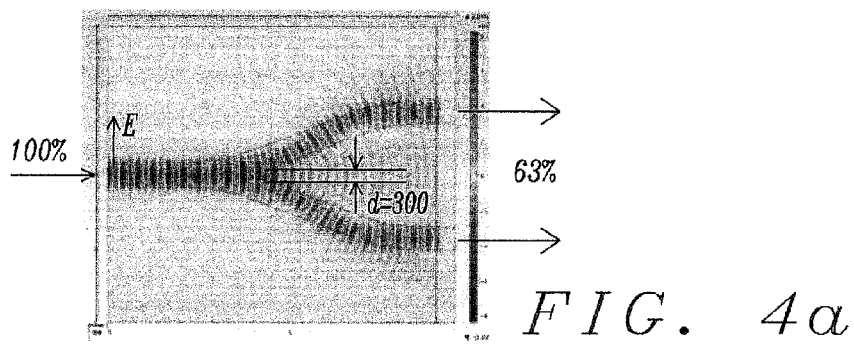
FIGS. 4 (a) and (b) are each a schematic illustration showing, in FIG. 4 (a) the simulated field amplitudes in each channel of the branching splitter of FIG. 2(b) and in FIG. 4 (b), showing, graphically, the transmission percentage as a function of the corner sharpness between the upper and lower branches.
Figure 4B:
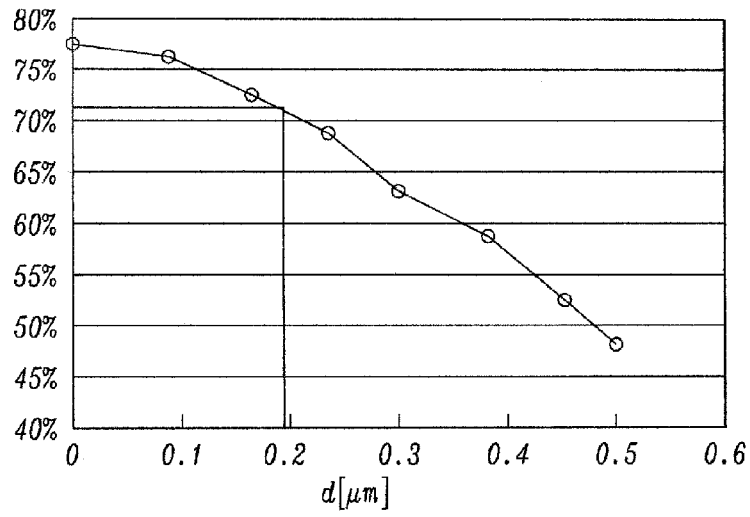

Referring to FIG. 4(b), it is shown that the percentage in the transmitted portion (here 63%) depends of the sharpness of the angular separation between the upper and lower branches.

FIG. 4(a) shows a nominal separation of 300 nm (as an example only), which corresponds to that 63% in the graph of FIG. 4(b).

After the phase shift occurs in either the mode beating or mode splitting arrangements of FIG. 2(a) or 2(b), the upper and lower channels are bent towards each other (re-convergence) so that they aim at the plasmon resonator (9). Thus, the propagation directions, k, of the waves also bend towards the plasmon resonator. The 180° phase shift now leads to a destructive interference in the x-z symmetry plane only of the components of E, (91) and (92), in the y-direction in the x-y plane of the ABS. However, each E, (91) and (92) now has a component in the −z-direction because of the tilt of the propagation vector k. These E-fields of the upper and lower branch constructively interfere with each other and combine to form the desired field pattern within the region where the plasmon resonator (9) is located.

Referring to schematic FIGS. 5 (a), 5(b), 5(c) and 5(d), there is shown the results of a field simulation in 5(c) and 5(d), assuming the geometrical arrangement shown schematically in the upper view (a) and ABS view (b), of a plasmon resonator (9) and projecting peg (11) that is located above the intersection of two waveguides. In the simulation, the two waveguides are treated as though they combine at the ABS so the plasmon resonator is completely within the evanescent interference field of their combined electromagnetic waves. The coupling to the plasmon resonator is through the evanescent field that fills the space between the waveguides (indicated, without a boundary, as (83) and (84)) and the resonator (9) shown above the waveguide.

Figure 5A:
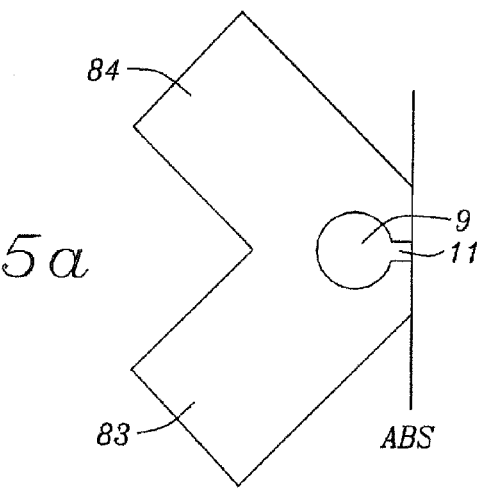
FIGS. 5 (a), 5(b), 5(c) and 5(d) are: top 5(a) and ABS 5(b) views of the apparatus shown in either FIGS. 2(a) and 2 (b) and of the simulated profile of the interfering electromagnetic fields (c) and of the energy (d) deposited by the plasmons at the recording medium.
Figure 5B:
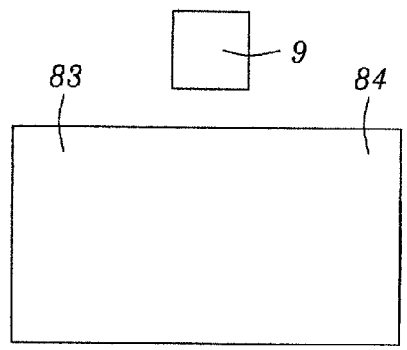
Figure 5C:
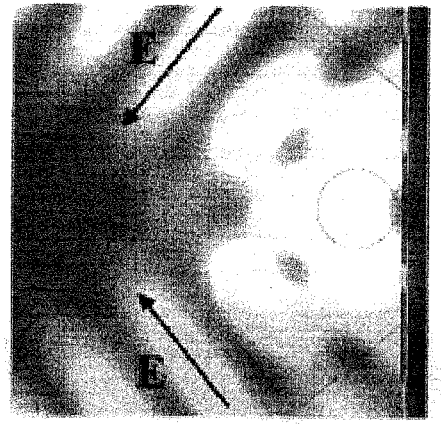
Figure 5D:
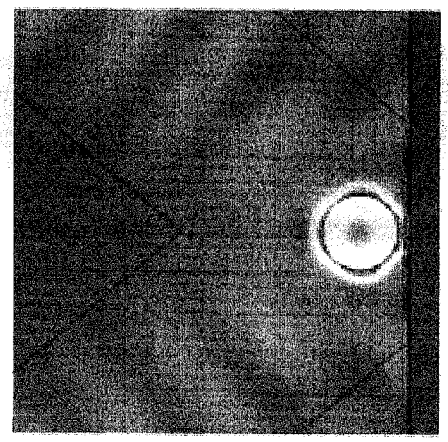

Referring to FIG. 5(c) there is shown the absolute magnitude of the resulting E field surrounding the plasmon resonator produced by the combination and resulting interference of the two tilted E fields (91) and (92). Note that the greatest magnitude, shown as the lightest color, is at the extreme ABS edge of the plasmon resonator disk, where there is an attached peg (11) that constrains the field within the region between the ABS and the medium. The size of the near field is constrained by the size of the peg, which is much smaller than a diffraction-limited optical radiation field would be. In FIG. 5(d) there is shown, as light and dark shadings) the magnitude of the plasmon eigenmode in the plane of the plasmon resonator.

Referring now to FIGS. 6 (a), 6(b), 6(c) and 6(d), there is shown schematically four mode splitting waveguides that each implement a phase shift in a different fashion. In (a) the phase shift is implemented by varying the width of part of the wavelength core (840). In (b), the phase shift is implemented by lengthening one branch (810) of the splitter. In (c) the phase shift is implemented by replacing a portion of one branch (842) with a different core material that has a slightly different refractive index. In (d) the phase shift is implemented by replacing the cladding (843) of a portion of one branch by a cladding having a different refractive index. These different implementations will play a role in distinguishing between various embodiments within the application.

Figure 7:
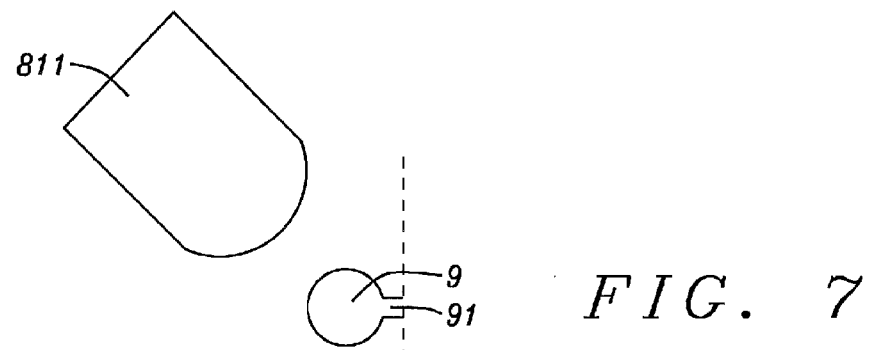
FIG. 7 shows a schematic enlargement of an overhead view of the ABS ends of the two branches of a waveguide terminating adjacent to a plasmon resonator. The ABS ends can be rounded to fine tune the wave front in accordance with the distance to the resonator and the various refractive indices.

Referring to FIG. 7, there is shown schematically the ends (811) and (821) of the two branches of the waveguide, which could be either the mode beating construction of FIG. 2(a) or the branching construction of FIG. 2(b). The ends are aimed at the plasmon resonator which is shown from above as a disk shaped conductor (9) with a small peg (91) extending from its ABS end. The ends of the branches are shown as rounded in a convex shape, but the rounding could also be concave. The effect of the rounding is to fine tune the interference pattern so that it might optimally match the eigenmodes of the plasmon resonator. The peg extending from the resonator serves to confine the near field of the plasmon eigenmode at the thermally heated region of the magnetic recording medium.

Figure 8B:
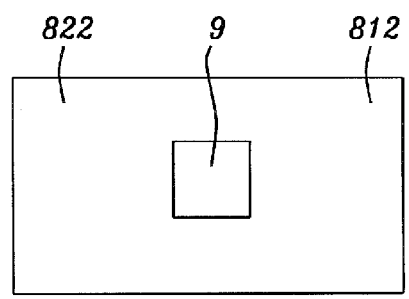
Figure 8C:
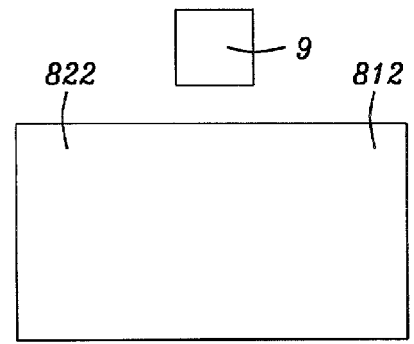

Referring to FIGS. 8 (a), 8(b) and 8(c), there is shown schematically two ends (812) and (822) of the waveguide branches that are merged to form a single integrated unit. The plasmon resonator (9) with its extended peg (91) is shown relative to the merged waveguide ends. Referring to FIG. 8(b), the resonator is shown as being within the combined ends, whereat it is overlapped by the interference field of the waveguide. Referring to FIG. 8(c) the plasmon resonator is shown separated from the merged ends and outside the waveguide core. In this location, its eigenmodes are excited by evanescent coupling.

First Embodiment

In its first embodiment, as shown schematically in FIGS. 1 (a) and (b), the present application provides a TAMR head that includes a main pole (1), a yoke (2), a back gap (3), a return pole (4), a pedestal (5), a sloped stitch pole (6) and the energizing coil (7). The optical portion of the structure includes the waveguide structure (8), which further includes a splitter (84) and (83) and a phase shifter (850) as shown in FIG. 7 (a). The magnetic portions generate magnetic fields in the magnetic recording medium to switch the magnetizations of the magnetic grains during the recording process. The plasmon resonator (9) creates a near field of a plasmon eigenmode that produces localized Joule heating in the medium during the time that it is being acted upon by the magnetic field. The heating reduces the anisotropy and coercivity of the medium to enable an easier switching by the field of the magnetic write pole.

Second Embodiment

This embodiment includes the same apparatus described above for the First Embodiment, except that the phase shifter is realized by increasing the length of one branch of the waveguide as shown in FIG. 7(b).

Third Embodiment

This embodiment is the same structure as described in the first embodiment, except that the phase shifter is realized by replacing a part of the waveguide core (see FIG. 7 (c)) in one branch of the splitter by an optically transparent material with a slightly different index of refraction than the material forming the core everywhere else in the waveguide.

Fourth Embodiment

This embodiment is the same structure as described in the first embodiment, except that the phase shifter is realized by replacing a part of the waveguide cladding (see FIG. 7 (d)) in one branch of the splitter by an optically transparent material with a slightly different index of refraction than the material forming the cladding everywhere else in the waveguide.

Fifth Embodiment

This embodiment is the same structure as described in the first embodiment, except that the phase shifter is realized by a combination of methods described in FIG. 7(a)-(d), with one of the methods placed in each branch of the splitter.

Sixth Embodiment

This embodiment encompasses all structures of the first five embodiments except that the waveguide is a mode beating structure (FIG. 2 (a)) and the phase shifting devices are adjusted to provide a 90° phase shift because the waveguide itself also provides a 90° phase shift.

Seventh Embodiment

Any of the first six embodiments where the end faces of the waveguide channels that point towards the plasmon resonator is curved (convex or concave) to fine tune the light wave front leaving the waveguide.

Eighth Embodiment

Any of the structures of the first six embodiments where the ends of the waveguide terminate at the ABS and the plasmon resonator is formed inside the waveguide core with appropriate adjustments to its dimensions (see FIG. 8 (b))

Ninth Embodiment

The structure of the eighth embodiment except that the plasmon resonator is positioned above the waveguide core where its eigenmodes are excited by the evanescent fields outside the waveguide.

Tenth Embodiment

Figures 1B, 1C:
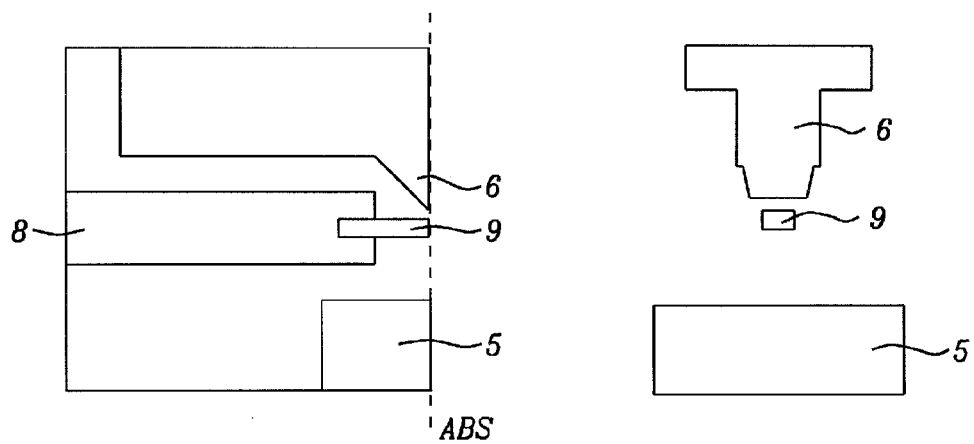
Figure 9A:
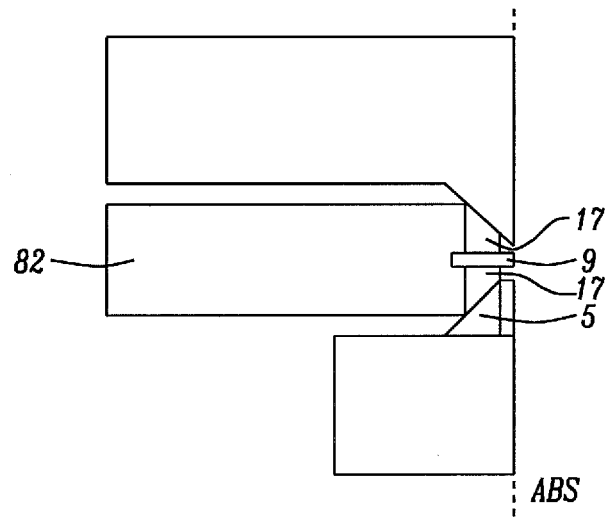
FIGS. 9 (a) and 9(b) are schematic illustrations of a plasmon resonator with an attached heat sink structure. A vertical cross-sectional view is shown in (a) and an overhead view is shown in (b).
Figure 9B:
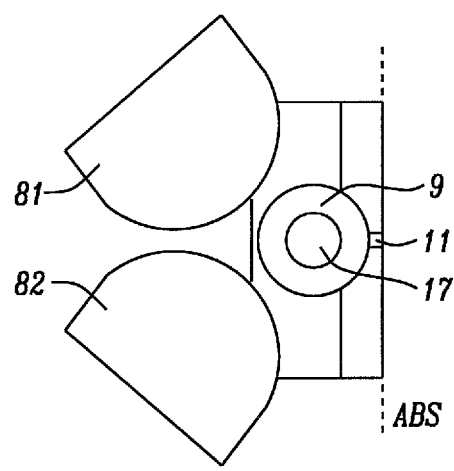

The structures described in the first eight embodiments where a heat sink structure is attached to the plasmon resonator as illustrated schematically in FIGS. 9(a) and 9(b). Referring to FIG. 9(a) there is shown a side cross-sectional view as in FIG. 1(b), showing the waveguide (82), the plasmon resonator (9) and a pedestal (5). Two heat sink elements, both labeled (17), contact the plasmon resonator from above and below. Referring next to FIG. 9(b), there is shown an overhead view of the converging waveguide channels (81) and (82), the plasmon resonator (9), the projecting peg (11) and the upper heat sink element (17) contacting the plasmon resonator from above. The heat sink consists of a good thermal conductor that connects the plasmon resonator to the metallic writer structure, such as at (5).

As is understood by a person skilled in the art, the embodiments of the present disclosure are illustrative of the present disclosure rather than being limiting of the present disclosure. Revisions and modifications may be made to methods, processes, materials, structures, and dimensions through which is formed a TAMR write head with a dual-channel waveguide whose interference pattern of optical modes excite the eigenmodes of a plasmon resonator having an integral peg at an ABS end, while still providing such a TAMR write head, formed in accord with the present disclosure as defined by the appended claims.

What is claimed is:

1. A TAMR (thermally assisted magnetic recording) head having an ABS end, comprising:
   a magnetic write pole which, when energized, produces a magnetic field for writing on a magnetic recording medium rotating beneath said ABS end;
   a source of electromagnetic radiation mounted on said head or external thereto;
   a double-branched waveguide, wherein said waveguide accepts said radiation in a single waveguide portion and creates a travelling mode of said radiation in each of two branches and directs each of said modes towards a plasmon resonator located at said ABS end; wherein
   a phase difference created between each of said travelling modes of said electromagnetic radiation is capable of producing an interference field of said electromagnetic radiation at the location of said plasmon resonator; wherein
   terminal ends of said branches proximal to said ABS end are bent at an angle and directed at said plasmon resonator to thereby produce said interference field; and wherein
   said terminal ends of said branches are merged or are separated; and wherein
   said electromagnetic radiation is directly or evanescently coupled to plasmon eigenmodes within said plasmon resonator, whereby near field portions of said plasmon eigenmodes impinge on said magnetic recording medium.

2. The TAMR head of claim 1 further including a peg formed at an ABS end of said plasmon resonator, whereby said near field portion of said plasmon eigenmode is confined to a region within a recording medium beneath and immediately surrounding said peg and whereby said near field transfers energy to said region within said recording medium and whereby said recording medium is heated, thereby facilitating a recording process.

3. The TAMR head of claim 1 wherein said waveguide is a mode beating splitter waveguide formed by a first and a second of two separate and physically distinct branches that partially overlap along linearly offset parallel linear portions that are separated by a uniform distance, wherein said first of said two branches includes a first portion that forms said single waveguide portion, wherein said first portion is continuously followed by a second portion of length d, which is separated by a distance s from an adjacent parallel linear portion of length d of said second branch and along which said overlap between said first and second branches occurs and wherein said two branches thereupon diverge and subsequently re-converge at said position of said plasmon oscillator.

4. The TAMR of claim 1 wherein said waveguide is a branching splitter waveguide formed of a single linear portion that splits continuously into two diverging branches that subsequently re-converge at said position of said plasmon oscillator and wherein said single linear portion is said single wavelength portion that accepts said radiation.

5. The TAMR head of claim 3 wherein said mode beating waveguide produces an intrinsic 90° phase shift in the travelling wave mode within said second branch relative to a phase at a corresponding position in said first branch.

6. The TAMR head of claim 1 wherein said ABS ends of said waveguide are merged.

7. The TAMR head of claim 1 wherein said ABS ends of said waveguide are separated.

8. The TAMR head of claim 3 wherein said second branch of said mode beating waveguide includes a phase shifting device that shifts a phase of a travelling mode in said branch by an additional 90° relative to a phase at a corresponding position in said first branch, thereby producing a net 180° phase shift between the branches.

9. The TAMR head of claim 4 wherein said mode splitting waveguide includes a phase shifting device in either branch that shifts a phase of a wave in said branch by 180°.

10. The TAMR head of claim 8 wherein said phase shifting device is a portion of said second branch that has a core of material with a different index of refraction than the remaining portion.

11. The TAMR head of claim 8 wherein said phase shifting device is a portion of said second branch that has a cladding formed to a different thickness or of a different material than the remaining portion.

12. The TAMR head of claim 8 wherein said phase shifting device is formed by lengthening said second branch relative to said first branch.

13. The TAMR head of claim 9 wherein said phase shifting device is a portion of either branch that has a core of material with a different index of refraction than the remaining portion.

14. The TAMR head of claim 9 wherein said phase shifting device is a portion of either branch that has a cladding formed to a different thickness or of a different material than the remaining portion.

15. The TAMR head of claim 9 wherein said phase shifting device is formed by lengthening one branch relative to the other.

16. The TAMR head of claim 6 wherein said plasmon resonator is formed above said merged ends and couples to said interference pattern through evanescent coupling.

17. The TAMR head of claim 6 wherein said plasmon resonator is formed within said merged ends and couples to said interference pattern directly.

18. The TAMR head of claim 6 wherein said plasmon resonator is formed between said separated ends.

19. The TAMR head of claim 1 wherein each branch of said double-branched waveguide is filled with the high index of refraction medium Tantalum oxide or Niobium oxide and clad with the low index of refraction material Silicon oxide or alumina, with the exception of those regions of a channel containing a phase shifting apparatus.

20. The TAMR head of claim 1 wherein each said waveguide branch is formed with a height in an x-direction of 400 nm and a width in a y-direction of 600 nm and a maximum separation of 12000 nm and wherein ends of said channels point at said plasmon resonator forming an angle of approximately 100°.

21. The TAMR head of claim 20 wherein each said waveguide branch is filled with a Ta oxide core having an index of refraction n=2.15 and is clad with a layer of Si oxide having an index of refraction of n=1.46.

22. The TAMR head of claim 21 wherein the optical frequency travelling mode within each said branch has a vacuum frequency of 808 nm and is polarized with its E-field initially in a y-direction and said plasmon resonator is a disk of radius 120 nm and a thickness in an x-direction of 30 nm and is formed of any of the elements Ag, Au, Cu and Al or combinations thereof.

23. The TAMR head of claim 4 wherein said branching splitter and said phase shifting device is a length of a channel that is 800 nm in width and 15000 nm in length.

24. The TAMR head of claim 3 wherein said waveguide is a mode beating splitter and said phase shifting device is a length of a channel that is 800 nm in width and 7500 nm in length.

25. The TAMR head of claim 1 including a heat sink structure formed connecting said plasmon resonator to said magnetic pole whereby heat generated in said plasmon resonator is conducted to said magnetic pole.

26. The TAMR head of claim 3 wherein said separation distance s=200 nm and said overlap distance d=20 microns.

27. The TAMR head of claim 3 wherein said two divergent channels are separated by a distance of 12 microns and re-converge by means of being curved towards each other with a radius of curvature of 6 microns.

28. The TAMR head of claim 4 wherein said two divergent channels are separated by a distance of 12 microns and re-converge by means of being curved towards each other with a radius of curvature of 6 microns.

* * * * *